United States Patent [19]
Hamada et al.

[11] Patent Number: 5,194,974
[45] Date of Patent: Mar. 16, 1993

[54] NON-FLICKER LIQUID CRYSTAL DISPLAY WITH CAPACITIVE CHARGE STORAGE

[75] Inventors: Hiroshi Hamada, Nara; Fumiaki Funada, Yamatokoriyama, both of Japan

[73] Assignee: Sharp Kabushiki Kaisha, Osaka, Japan

[21] Appl. No.: 893,892

[22] Filed: Jun. 4, 1992

Related U.S. Application Data

[63] Continuation of Ser. No. 569,022, Aug. 17, 1990, abandoned.

[30] Foreign Application Priority Data

Aug. 21, 1989 [JP] Japan .................. 1-215785
Aug. 21, 1989 [JP] Japan .................. 1-215786

[51] Int. Cl.$^5$ ............................... G02F 1/13
[52] U.S. Cl. .................... 359/59; 359/54; 359/85; 359/87
[58] Field of Search ........... 350/333, 334, 336, 332; 340/784, 789, 777; 359/54, 59, 85, 87, 88

[56] References Cited

U.S. PATENT DOCUMENTS

| | | | |
|---|---|---|---|
| 4,386,352 | 5/1983 | Nonomura et al. | 350/333 |
| 4,537,471 | 8/1985 | Grinberg et al. | 350/333 |
| 4,870,396 | 9/1989 | Shields | 340/784 |
| 4,904,989 | 2/1990 | Matsui et al. | 340/784 |
| 4,907,862 | 3/1990 | Suntota | 350/333 |

FOREIGN PATENT DOCUMENTS

| | | | |
|---|---|---|---|
| 0-086349 | 8/1983 | European Pat. Off. | 350/333 |
| 8502931 | 7/1985 | European Pat. Off. | 350/333 |
| 54-51500 | 4/1979 | Japan | 340/784 |
| 61-35972 | 2/1986 | Japan | 357/4 |
| 61-67964 | 4/1986 | Japan | 357/4 |
| 63-273838 | 11/1988 | Japan | 340/784 |
| 1-95581 | 4/1989 | Japan | 350/333 |
| 2-272521 | 11/1990 | Japan | 350/333 |
| 2-115199 | 9/1983 | United Kingdom | 350/334 |
| 2-133602 | 7/1984 | United Kingdom | 340/784 |

OTHER PUBLICATIONS

Newman, "AC Drive Circuit for an Integrated LC-Silicon Display", IBM Technical Disclosure Bulletin, vol. 24, No. 7B, Dec. 1981.

Depp et al., "Liquid Crystal Display Driver Circuit and Polysilicon Components Therefore", IBM Technical Disclosure Bul., vol. 23, No. 8, Jan. 1981.

G. H. Heilmeier et al., Proceedings of the IEEE, vol. 56, No. 7, Jul. 1968, pp. 1162-1171, "Dynamic Scattering:.. . Nematic Liquid Crystals".

D. L. White et al., Journal of Applied Physics, vol. 45, No. 11, Nov. 1974, pp. 4718-4723, "New Absorptive Mode Reflective Liquid Crystal Display Device".

J. J. Wysocki et al., Proceedings of the S.I.D., vol. 13/2, Second Quarter, 1972, pp. 114-120, "Cholesteric-Nematic Phase Transition Display".

N. Bryer et al., Japan Display '86, pp. 80-83, "Elimination of Metallisation Cross-Overs in Polysilicon TFT-Matrix LCDs", 1986.

J. F. Clerc et al., Japan Display '86, pp. 84-87, "New Electrodes Architectures for Liquid Crystal Displays Based on Thin Film Transistors", 1986.

Patent Abstracts of Japan, vol. 9, No. 161 (P-370) [1884], 5th Jul. 1985; & JP-A-60 37 527 (Sharp K.K.) Feb. 26, 1985.

Patent Abstracts of Japan, vol. 13, No. 271 (P-889) [3619], 22nd Jun. 1989; & JP-A-1 63 928 (Hitachi Ltd.) Mar. 09, 1989.

Primary Examiner—Rolf Hille
Assistant Examiner—Minhloan Tran
Attorney, Agent, or Firm—Nixon & Vanderhye

[57] ABSTRACT

A liquid crystal display apparatus which stores a charge in the capacitor whereby the liquid crystal layer is continuously driven even if leak occurs therethrough, and which prevents any d.c. component from being applied to the liquid crystal layer, thus maintaining a display of clear, non-flickering constant image on the screen.

19 Claims, 4 Drawing Sheets

NON-FLICKER LIQUID CRYSTAL DISPLAY WITH CAPACITIVE CHARGE STORAGE

This is a continuation of application Ser. No. 07/569,022, filed Aug. 17, 1990, now abandoned.

BACKGROUND OF INVENTION

1. Field of the Invention

The present invention relates generally to a liquid crystal display apparatus, and more particularly to an active matrix type liquid crystal display apparatus adapted for use in the precision finders of cameras and projection type televisions.

2. Description of the Background of the Invention

It is known in the art that a matrix type liquid crystal display apparatus is used to utilize the electrooptical effects of liquid crystal to modulate an incident light to picture elements and make up a TV picture and the like. This type of display apparatus includes a liquid crystal layer between two electrodes, that is, a plurality of picture element electrodes arranged in a dot-matrix, and counter electrodes corresponding to the picture element electrodes, wherein the liquid crystal layer optically modulates an incident light in response to an applied voltage.

The matrix type liquid crystal display apparatus, hereinafter referred to as "display apparatus", can take various modes depending upon the kinds of the liquid crystal to be used or the electrooptical properties thereof; for example, a twisted nematic (TN) mode, a super twisted nematic (STN) mode, a guest and host (GH) mode, a dynamic scattering (DS) mode, a phase transition mode, and any other suitable mode can be appropriately selected. The display picture elements consisting of the liquid crystal and the picture element electrodes are individually controlled by various methods, for example:

(1) A simple-matrix method;
(2) A method using a non-linear two-terminal device (e.g., a diode) added to each picture element electrode; and
(3) A method using a switching three-terminal device (e.g., thin film transistor (TFT)) added to each picture element electrode.

The methods (2) and (3) are generally called an active matrix system.

The DS mode (Proc IEEE 56 1162 (1968) by G.H. Heilmeier et al), a White Taylor type GH mode (J. Appl. Phys. 45 4718 (1974) by D.L. White et al), and a cholesteric nematic phase transition mode (Proc. SID 13/2 115 (1980) by J.J. Wysocki) are advantageous when they are used in association with an active matrix system using TFT, in that the display brightness is enhanced without the use of a polarizer.

However, this display apparatus has a problem that the addition of a dichroic dye which contains ionizable impurities increases the specific electric conductivity of the liquid crystal layer. As a result, the charge stored in the electrodes between which the liquid crystal layer is sandwiched easily leaks through the liquid crystal layer. To solve this problem, as shown in FIG. 8 a signal voltage storing capacitor $C_1$ (i.e., an additional capacitor) is provided in parallel with a picture element capacitor $C_2$ connected to a drain electrode of the TFT, so as to increase the capacity of the capacitor $C_1$. In this way the electric charge is maintained.

However, the method using the signal voltage storing capacitor $C_1$ basically has a limitation in maintaining the charge, and in order to drive a highly integrated matrix display apparatus having many capacitors $C_1$ of sufficient capacitance, the source driver and the switching TFT must supply a very large current, and the resistance of the source bus line must be very low. In addition, the space for accommodating picture element electrodes is accordingly reduced, and manufacturing difficulty is involved.

FIG. 9 shows an example which drives an equivalent circuit in a similar manner to the present invention. That is, an active matrix type liquid crystal display apparatus. The apparatus is provided with picture elements each of which comprises two capacitors $C_2$ and a three-terminal element such as TFT, wherein the picture elements and the TFT are arranged in a matrix ("Japan Display Digest", page 80 to 83).

In this display apparatus the pairs of picture element electrodes are connected to the source and drain of each TFT and counter electrodes $T_R$ and TD corresponding to the respective picture element electrodes. The electrodes $T_R$ are connected to a reference electrode line R, and the electrode $T_D$ is connected ed to the data electrode line D. The reference line R is earthed or maintained at a constant level of voltage, and the data electrode line D is applied with a signal voltage in accordance with the information to be displayed. Under this arrangement, when the gate voltage is at a high level, the TFT is on, thereby forming a closed circuit starting from the data electrode line D, the liquid crystal layer, the first picture element electrode, the TFT, the second picture element electrode, the liquid crystal layer, and ending at the reference electrode line R. As long as the gate voltage is at a high level, the capacitors $C_2$ and $C'_2$ are charged. However, this charge does not last, and gradually discharge through the liquid crystal layer and switching three-terminal element when the TFT is off. In order to maintain the charge in the capacitors sufficient to drive the liquid crystal properly, it is required to prepare liquid crystal having an extremely high specific resistance.

To solve the problem pointed out above, the inventors have made an invention shown in FIG. 7, for which Japanese Patent Application No. 1-95581 is pending laid open on Jul. 11, 1990 as No. 2-272521. According to the prior application, the signal volt storing capacitor $C_1$ is separated from the picture element capacitor $C_2$ by the $TFT_2$. The $TFT_1$ and the capacitor $C_1$ function as a sampling/holding circuit. While the $TFT_1$ is on, the capacitor $C_1$ is charged with the signal voltage through the drain of the $TFT_1$, and after the $TFT_1$ is off, the capacitor $C_1$ keeps the signal voltage being applied to the gate of the $TFT_2$ until the next signal voltage is sampled through the drain. The advantage of this method of FIG. 7 is that even if the liquid crystal has a small specific resistance, the display is protected against an unfavorable influence of discharge in the liquid crystal. However, when the halftone image is to be displayed, a problem arises. In FIG. 7, suppose that the capacitor $C_2$ is not charged, that is, the picture element "a" and the counter electrode "b" are at an equal potential, and that the capacitor $C_1$ is negatively charged. In this situation, the gate potential of the $TFT_2$ is kept negative, the $TFT_2$ is off, and the picture element electrode "a" is electrically isolated from the earth line. At this stage, an a.c. voltage $V_C$ is applied to the counter electrodes, the potential of the picture element electrode a changes accordingly.

Then, when the capacitor $C_1$ is positively charged, the $TFT_2$ is on. The capacitor $C_2$ is charged at a time constant $\tau_{ON}=C_2R_{ON}$. At this stage, the potential of the picture element electrode a has the same polarity as $V_C$, and gradually becomes equal to the earth potential. When the halftone image is to be displayed, it is required to repeat the polar reversion of the voltage $V_C$ in a shorter period of time than the period of time required for the completely charging of the capacitor $C_2$.

However, the polar reversion of voltage $V_C$ changes the potential of the drain, thereby changing the "on" resistance $R_{ON}$ of $TFT_2$. Even if the positive/negative symmetrical a.c. voltage is applied as the voltage $V_C$, the operating point of the $TFT_2$ unavoidably changes with time, thereby causing the "on" resistance $R_{ON}$ to have different values between the positive half-cycle and the negative half-cycle. Thus, the potentials of the picture element electrode "a" and the counter electrode "b" are non-symmetrical for negative and positive, thereby bringing a direct current component into the voltage applied to the liquid crystal layer of the capacitor $C_2$. This d.c. component causes a flickering in the pictures on the screen.

When the liquid crystal layer has a d.c. component, the liquid crystal and electrodes are liable to electrolysis. This is detrimental to the formation of clear image.

SUMMARY OF THE INVENTION

The liquid crystal display apparatus of the present invention, which overcomes the above-discussed and numerous other disadvantages and deficiencies of the known art, comprises a plurality of unit circuit areas formed with electrode lines X and Y crossing each other in an electrically isolated state, each unit circuit area comprising a pair of picture element electrodes and a pair of counter electrodes, a first switching three-terminal element having a source connected to the line X and a gate connected to the line Y near the crossover of the lines X and Y, a liquid crystal layer being disposed between the picture element electrodes and counter electrodes, a second switching three-terminal element having its gate connected to the drain of the first switching three-terminal element, and having its source and drain connected to the picture element electrodes, a signal storing capacitor being disposed between either of the earth line or the adjacent line Y and the drain of the first switching three-terminal element, and an a.c. voltage source for delivering an a.c. voltage to the counter electrodes.

In a preferred embodiment, each of the counter electrodes in one unit circuit area is electrically connected to the corresponding counter electrode in the adjacent unit circuit area.

In a further preferred embodiment, the specific resistance of the liquid crystal is not greater than $10^9$ $\Omega$m within the effective range of temperatures at which the liquid crystal display apparatus is operable.

In a still further preferred embodiment, the a.c. voltage source delivers a positive/negative symmetrical a.c. voltage having reversed phases in each one cycle.

According to another aspect of the present invention, the liquid crystal display apparatus liquid crystal display apparatus comprising a plurality of unit circuit areas formed with electrode lines X and Y crossing each other in an electrically isolated state, each unit circuit area comprising a pair of picture element electrodes and a pair of counter electrodes, a first switching three-terminal element having a source connected to the line X and a gate connected to the line Y near the crossover of the lines X and Y, a liquid crystal layer being disposed between the picture element electrodes and the counter electrodes, a common line for delivery of an a.c. voltage having an opposite phase to that of the a.c. voltage, a liquid crystal layer being disposed between the picture element electrode and the counter electrode, a second switching three-terminal element having its gate connected to the drain of the first switching three-terminal element, and having its source and drain connected to the picture element electrode and the common line, and a signal storing capacitor formed between either of the earth line or the adjacent line Y and the drain of the first switching three-terminal element.

In a preferred embodiment, a dummy load is additionally inserted between the source of the second switching three-terminal element and the common line, the dummy load having an impedance approximately equal to that of the liquid crystal.

The electrode lines X and Y are selected by scanning at a short frame frequency, so that the first switching three-terminal element is made in the "on" state for a relative short period of time. However, owing to the charge stored in the storing capacitor the voltage is continuously applied to the gate of the second switching three-terminal element until the next signal is sampled, thereby maintaining the second three-terminal element in the "on" state. Since the charge stored in the storing capacitor is separated from the liquid crystal layer by means of the second switching three-terminal element, the charge is prevented from leaking which would otherwise occur through the liquid crystal layer. Thus, the charge is held for a longer period of time. This is important for maintaining a display of clear and non-flickering constant image on the screen.

On the other hand, so long as the second switching three-terminal element is kept on, no unfavorable influence is given on the image on the screen because the charge is continuously delivered to drive the liquid crystal layer even if any leak occurs in the layer. In this case, even if the liquid crystal layer is made of a substance having a small specific resistance, the display is maintained for one frame frequency.

When a positive and negative symmetrical (per one cycle) and an opposite phase voltage is applied between the counter electrode and the common electrode or alternatively a positive and negative symmetrical (per one cycle) voltage is applied to between the pair of counter electrodes, a virtually perfect positive and negative symmetrical voltage is applied to the liquid crystal layer through the second three-terminal element channel, thereby preventing any d.c. component from being applied thereto. It ensures that no flickering occurs in the image on the screen.

Thus, the invention described herein makes possible the objectives of providing a liquid crystal display apparatus (1) which prevents any d.c. component from being unexpectedly applied to the liquid crystal layer, and (2) which can display halftone images as clearly as any other tone images.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1:
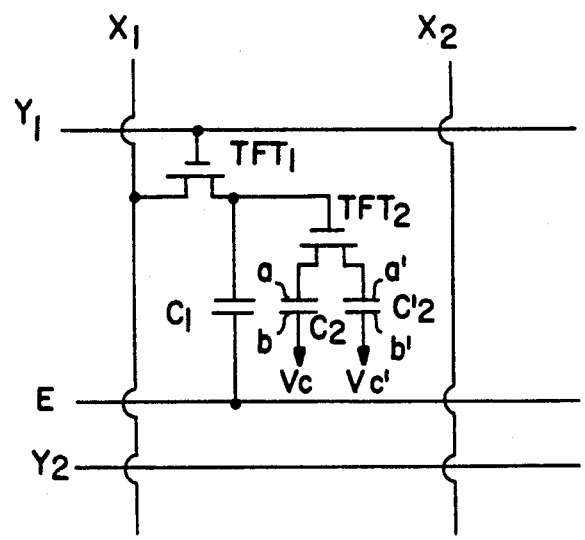
FIG. 1 is a circuit diagram showing a unit circuit area of an equivalent circuit used in a liquid crystal display apparatus according to the present invention.

Referring to FIG. 1, an example (1) of the embodiment according to the present invention will be described:

FIG. 1 shows a unit circuit area of a circuit incorporated in the display apparatus of the present invention. Each unit circuit area is framed by electrode lines X and Y. The unit circuit area has a pair of picture element electrodes and a pair of counter electrodes. A voltage is output by a drain of a first switching three-terminal element that is selected in accordance with electrode line X and Y, thereby storing a charge in a signal voltage storing capacitor, and applying it to a gate of a second switching three-terminal element. Voltage is applied to the unit circuit area whereby the picture element electrodes are energized. By the application of this voltage, a closed circuit is completed from one of the counter electrode "b", the liquid crystal layer "$C_2$", one of the picture element electrodes "a", the $TFT_2$ (i.e., from the source to the drain of the second switching three-terminal element), the other picture element electrode "a'", the crystal liquid layer "$C'_2$", and the other counter electrode "b'". The picture element electrodes display when the liquid crystal layer is driven by the application of an a.c. voltage.

Figure 2:
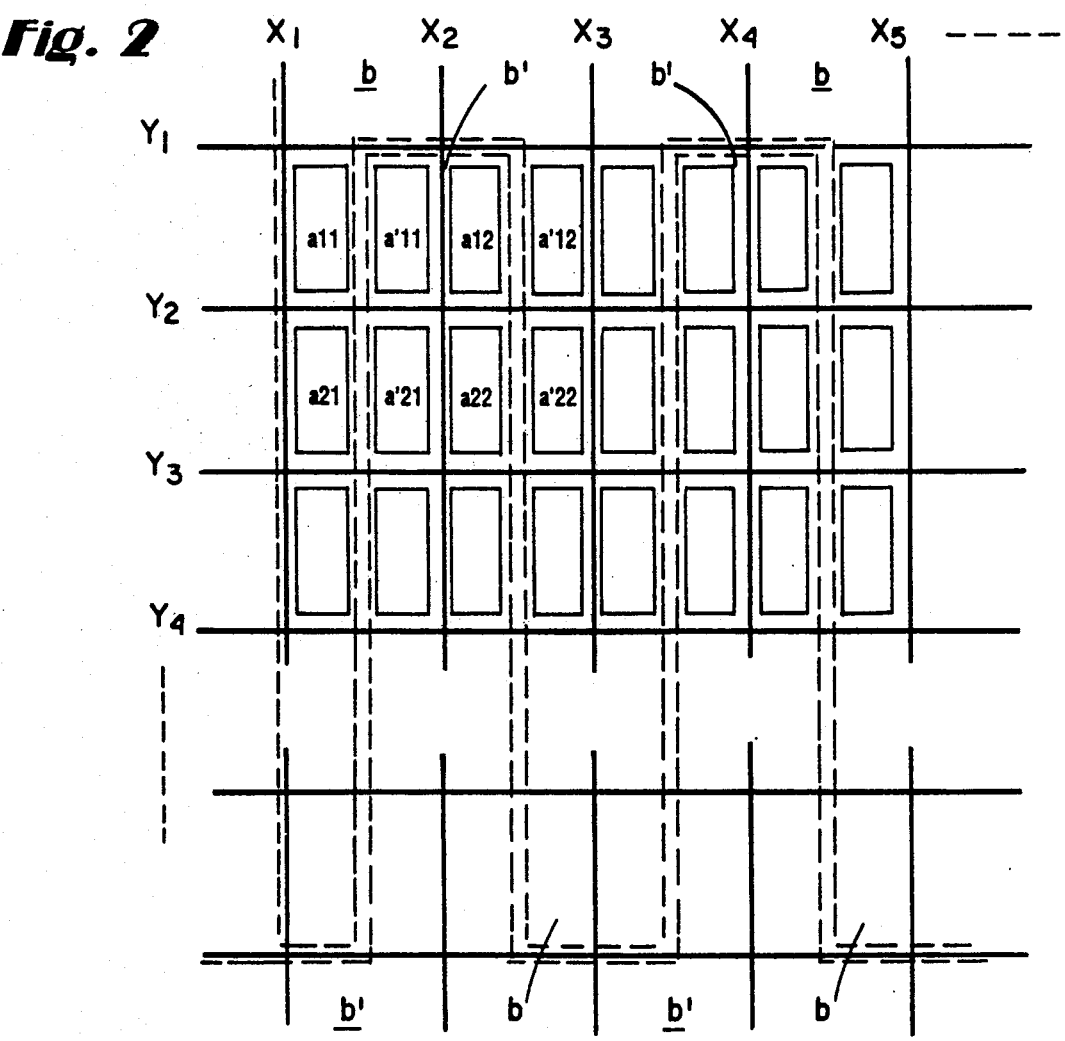
FIG. 2 is a schematic plan view of the unit circuit area portion of FIG. 1 showing the positional relationship between the picture element electrodes and the counter electrodes.

Referring to FIGS. 1 and 2, the electrode lines $X_1$, $X_2$ and so on are bus lines for data signals, and the lines $Y_1$, $Y_2$ and so on are also bus lines for scanning signals. These electrode lines X and Y are crossed in an electrically isolated state, that is, with the interposition of insulating films, hereinafter referred to as to as "crossover". A first $TFT_1$ is located adjacent to one of the crossover whose gate is connected to the line Y ($Y_1$) and whose source is connected to the line X ($X_1$). The drain of the $TFT_1$ is connected to the gate of a second $TFT_2$ that functions as a second three-terminal element. The $TFT_2$ is connected to a signal storing capacitor $C_1$ whose other electrode is earthed.

Referring to FIG. 2, the source and drain of the second $TFT_2$ are connected to a pair of picture element electrodes "a" and "a'". Each pair of picture element electrodes have a pair of counter electrodes "b" and "b'". A liquid crystal layer is disposed between the picture element electrodes and the counter electrode so as to form picture element capacities $C_2$ and $C'_2$. An a.c. voltage source $V_C$ delivers a.c. voltage to the liquid crystal layer.

By adopting the circuit mentioned above, a DS mode projection type active matrix liquid crystal display apparatus (hereinafter referred to as "display apparatus") was constructed:

(1) Method of display: projection type
(2) Light source: metalhalide lamp
(3) Size of panel: 3 inches (diagonal)
(4) Number of picture elements: 240×384 dots
(5) Substrate of panel: glass 1.1t Corning 7059
(6) $TFT_1$, $TFT_2$ amorphous silicon TFT
  Gate made of Ta, oxidized film $Ta_2O_5/SiN_x$
  semiconductor made of a-Si by P-CVD
  source, drain made of $n^+$ a-Si/Ti
(7) Capacitor $C_1$: Ta/$Ta_2O_5$. $SiN_x$/Ti
(8) Capacitor $C_2$: ITO/liquid crystal layer/ITO (thickness of liquid crystal was set by a plastic-bead spacer of 7 μm
(9) Liquid crystal layer:

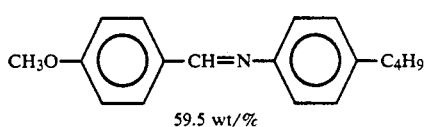

59.5 wt/%

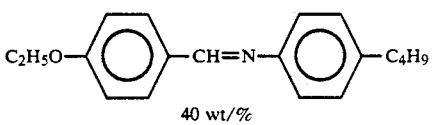

40 wt/%

The following ionizing impurities were added:
(10) Ionized impurities:

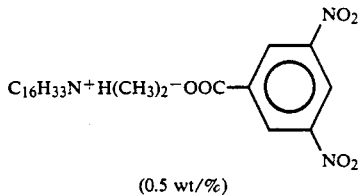

(0.5 wt/%)

(11) A.C. voltage: 60 Hz (rectangular waveform) ±7.5 V (Note) The liquid crystal layer has a specific resistance (ρ) of $10^7$ Ωm.

The $TFT_1$ and the capacitor $C_1$ constitute a sampling-/holding circuit, whose output is connected to the gate of the $TFT_2$ that functions as a buffer transistor for applying an a.c. voltage to the liquid crystal layer in the liquid crystal layer.

Under the arrangement mentioned above, the capacitor $C_1$ is connected not directly to the capacitors $C_2$ and $C'_2$ but to the gate of the second $TFT_2$ having high input impedance, thereby making it difficult to discharge. As a result, the charge stored in the capacitor $C_1$ keeps the $TFT_2$ on for a relative long period of time even after the $TFT_1$ is off.

This is of particular advantage when the used liquid crystal is of a type which is easy to discharge because of its small specific resistance. In this way, the $TFT_2$ is prevented from becoming off before a required period of time (usually, 1 cycle of the frame frequency) expires, thereby ensuring that the display apparatus continues to display for a desired period of time.

The a.c. voltage source $V_C$ applies an a.c. voltage between the pair of electrodes "b" and "b'". The application of a symmetrical a.c. voltage enables the capacitors $C_2$ and $C'_2$ to behave symmetrically in response to the polar changes of the voltage from the power source $V_C$ for driving the liquid crystal layer.

The illustrated apparatus takes an interdigital form in which stripe electrodes "b" and "b'" are disposed in alternate rows along the lines X or Y depending upon the arrangement of pairs of picture element electrodes $a_{11}$ and $a'_{11}$, $a_{12}$ and $a'_{12}$ and so on.

FIG. 2 shows an arrangement in which a pair of picture element electrodes $a_{11}$ and $a'_{11}$, $a_{12}$ and $a'_{12}$ are laterally disposed, and the counter electrodes of a stripe type are vertically disposed. However, the lateral and vertical directions of them can be changed as a matter of design. A single stripe electrode is disposed in such a manner that it covers one of the picture element electrodes and one of the adjacent picture element electrodes.

The apparatus was experimentally operated to display on a screen, and the resulting image thereon was compared with that obtained by a conventional TN mode apparatus with the use of the same light source. The result was that the luminance was about two times (i.e., 100 fL) that of the image under the known apparatus under the display in white.

Figure 3:
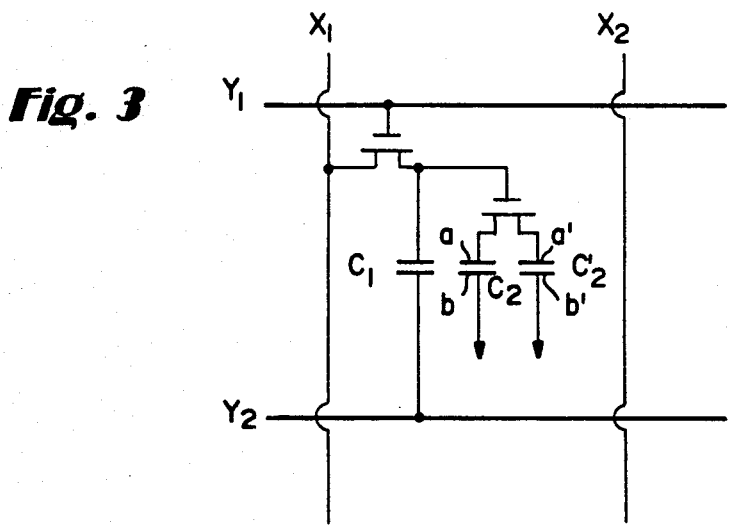
FIG. 3 is a circuit diagram showing a unit circuit area of an equivalent circuit used in a first example of the embodiment.

Referring to FIG. 3, an example (2) will be described:

This example is different from the first example in that one of the electrodes of the capacitor $C_1$ is connected to the adjacent gate line. The advantage of this example is that the earth line can be omitted.

Figure 4:
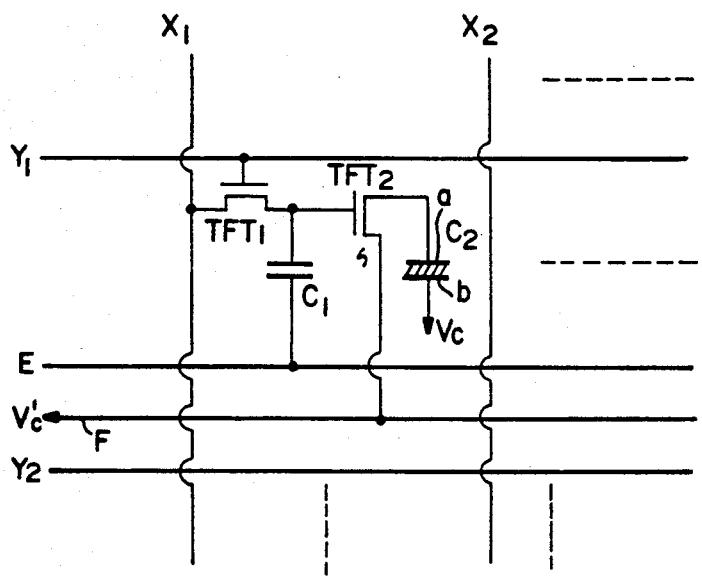
FIG. 4 is a circuit diagram showing a unit circuit area of an equivalent circuit used in a second example of the embodiment.

Referring to FIG. 4, an example (3) will be described:

Basically the circuit has the same construction as that of the first example shown in FIG. 1 but it is different therefrom in that one picture element has a single picture element electrode "a", and that the source of the $TFT_2$, that is, the second switching three-terminal element is connected to the common line F to which an a.c. voltage is applied from a source $V_{C'}$ to drive the liquid crystal. By adopting this circuit, a DS mode display apparatus having no polarizing filter was constructed:

(1) Method of display: projection type
(2) Light source: metalhalide lamp
(3) Size of panel: 3 inches (diagonal)
(4) Number of picture elements: 240×384 dots
(5) Substrate of panel: glass 1.lt Corning 7059
(6) $TFT_1$, $TFT_2$: amorphous silicon TFT
 Gate made of Ta, oxidized film $Ta_2O_5/SiN_x$
 semiconductor made of a-Si by P-CVD
 source, drain made of n+ a-Si/Ti
(7) Capacitor $C_1$: $Ta/Ta_2O_5 \cdot SiN_x/Ti$
(8) Capacitor $C_2$: ITO/liquid crystal layer/ITO (thickness of liquid crystal was set by a plastic-bead spacer of 7 μm)
(9) Liquid crystal layer:

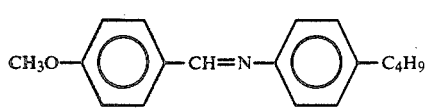

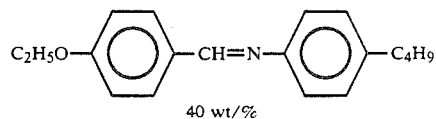

59.5 wt/%

40 wt/%

The following ionizing impurities were added:
(10) Ionized impurities:

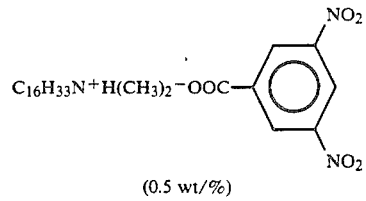

(0.5 wt/%)

(11) A.C. voltage: 60 Hz (rectangular waveform) ±7.5 V (Note) The liquid crystal layer has specific resistance of $10^7$ Ωm. The area (S) of the picture element was 100 μm$^2$(10$^{-8}$m$^2$), and the thickness (d) of the liquid crystal was 7 μm. Therefore, the resistance ($R_{LC}$) was $(\rho \cdot d)/s = 7 \times 10^9$ Ω.

In this example (3) the $TFT_1$ and capacitor $C_1$ also function as a sample holding circuit. Therefore, after the $TFT_1$ was off, the $TFT_2$ remains on for a longer period of time.

A reversed-phase a.c. voltage is applied to the common line F from the source $V_{C'}$, the reversed-phase a.c. voltage having the same frequency as that of the voltage applied to the electrodes "b" from the other source $V_C$. In this way the $TFT_2$ behaves symmetrically when the source $V_C$ is positive and negative.

This version was experimentally operated to display on a screen, and the resulting image thereon was compared with that obtained by a conventional TN mode apparatus with the use of the same light source. The result was that the luminance was about two times (i.e., 100 fL) that of the image under the known apparatus under the display in white.

Figure 5:
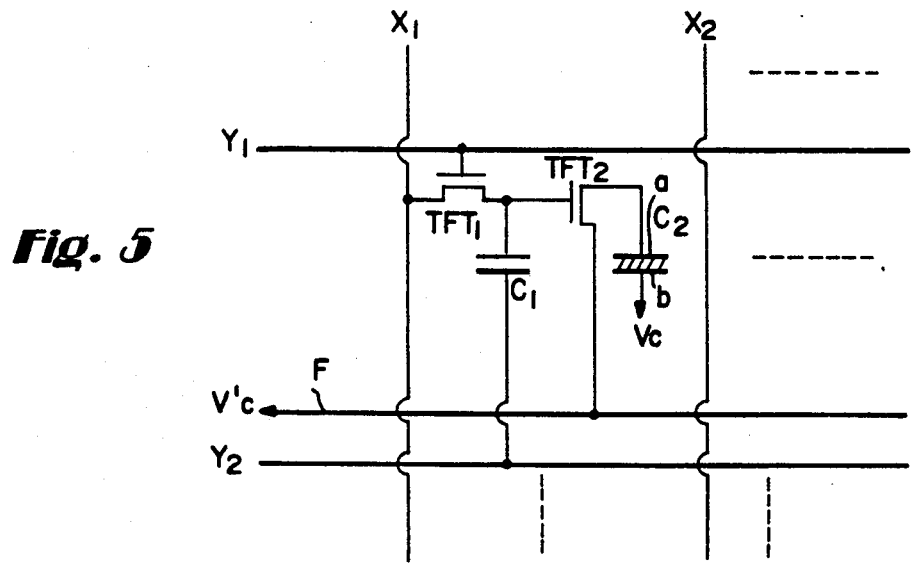
FIG. 5 is a circuit diagram showing a unit circuit area of an equivalent circuit used in a third example of the embodiment.

Referring to FIG. 5, an example (4) will be described:

This example (4) is different from example (3) of FIG. 4, in that one of the electrodes in the capacitor $C_1$ is connected to the electrode lines $Y_2$ adjacent thereto, thereby omitting the earth line.

Figure 6:
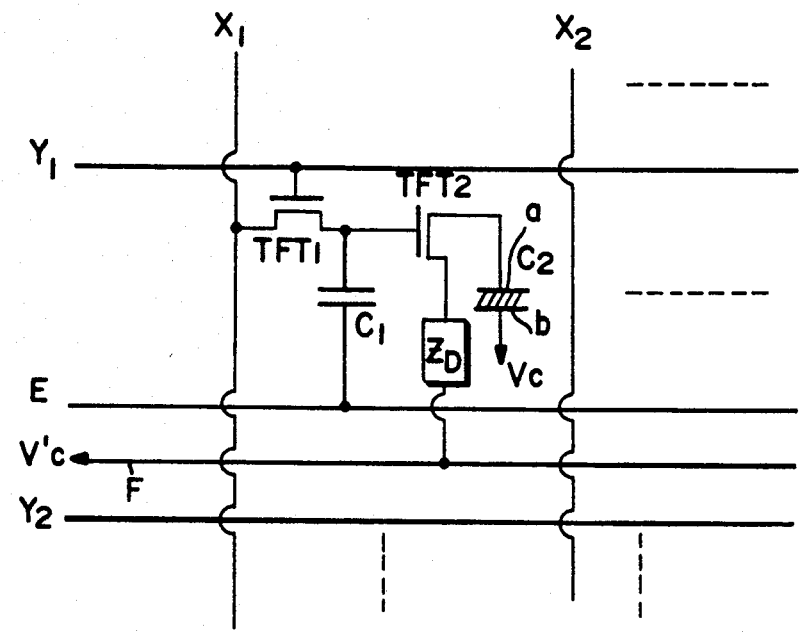
FIG. 6 is a circuit diagram showing a unit circuit area of an equivalent circuit used in a fourth example of the embodiment.
Figure 7:
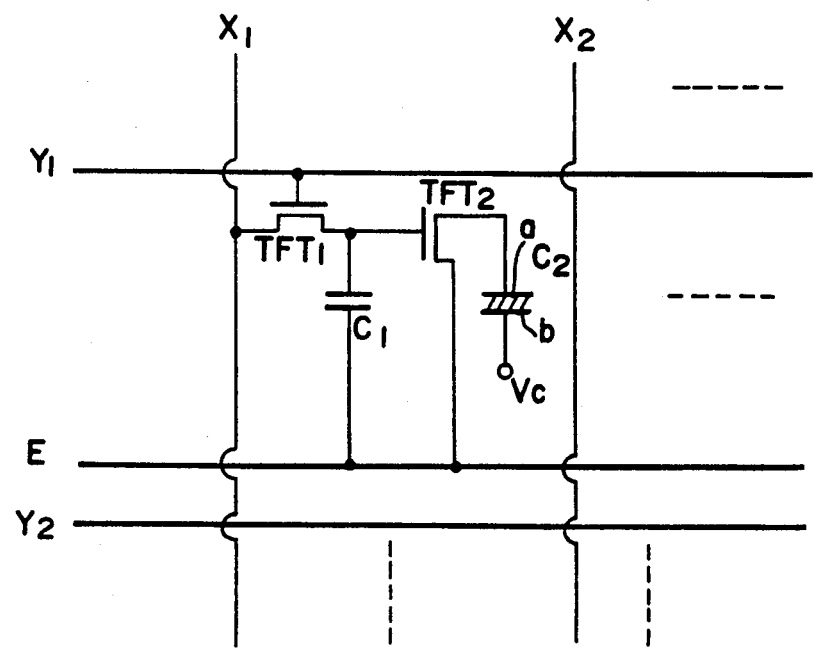
FIG. 7 is a circuit diagram showing a unit circuit area of an equivalent circuit used in a liquid crystal display apparatus made prior to the present invention.
Figure 8:
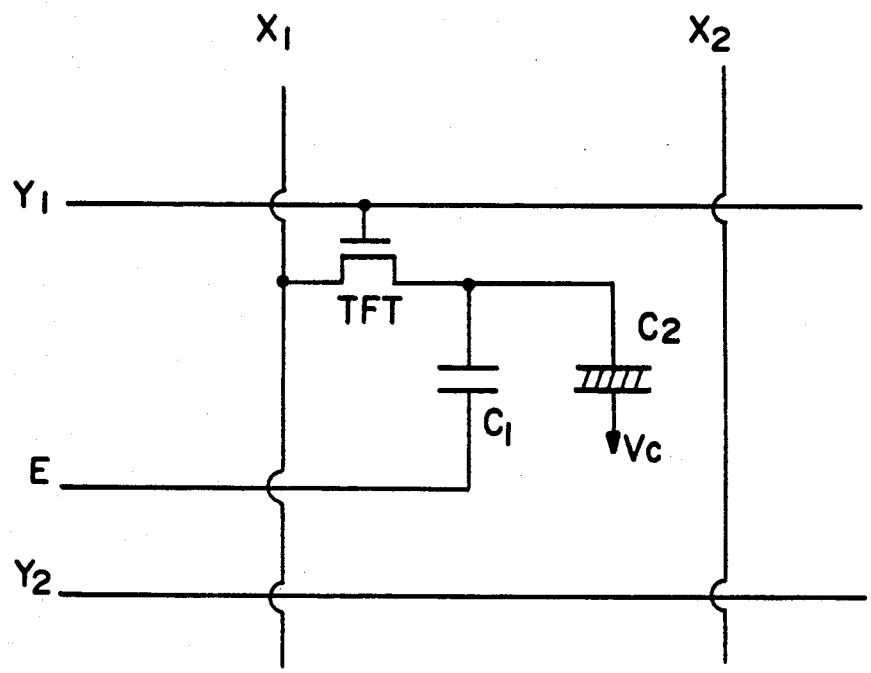
FIGS. 8 and 9 are circuit diagrams showing unit circuit areas of equivalent circuits used in a known liquid crystal display apparatus.
Figure 9:
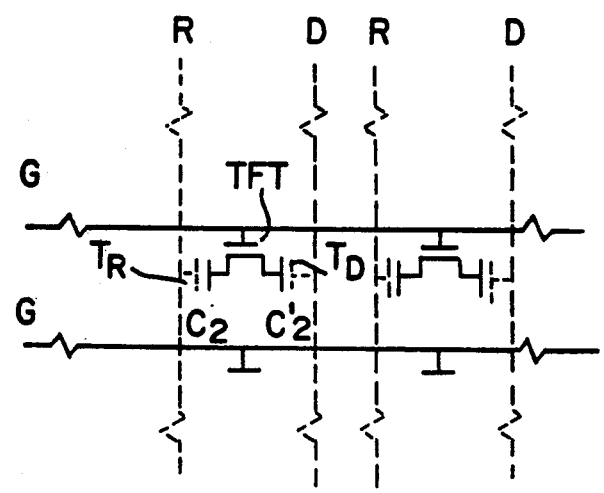

Referring to FIG. 6, there is provided an example (5) characterized in that a dummy load $Z_D$ is inserted between the common line and the drain of the $TFT_2$. The dummy load, for example, is provided by interposing a non-doped a-Si film (film thickness d=28 nm, specific resistance $\rho = 10^8$ Ωm) between the drain of the $TFT_2$ and the common line. The overlapping area is 20 μm$^2$, and therefore, the dummy load $Z_D$ has a resistance R' of $7 \times 10^9$ Ω, which is equal to the resistance $R_{LC}$ of the liquid crystal. The feature of this example (5) is that the dummy load having the same resistance as that of the liquid crystal is inserted between the drain electrode and the common line, thereby enabling an applied voltage to operate the display apparatus in the same manner irrespective of whether it is negative or positive. As a result, no flickering was discerned.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid crystal display apparatus comprising a plurality of unit circuit area formed with electrode lines X and Y crossing each other in an electrically isolated state, said plurality of unit circuit areas being arranged to provide a matrix comprising rows and columns of display elements, said display apparatus further including first and second counter electrodes and an a.c. voltage source for delivering an a.c. voltage to the first and second counter electrodes, each of said plurality of unit circuit areas comprising:
- a pair of picture element electrodes each of which opposes one of said first and second counter electrodes,
- a first switching three-terminal element having a source connected to the line X and a gate connected to the line Y near a crossover of the lines X and Y,
- a liquid crystal layer being disposed between the picture element electrodes and counter electrodes,
- a second switching three-terminal element having its gate connected to a drain of the first switching three-terminal element, and having its source and drain connected to the picture element electrodes, and
- a signal storing capacitor being disposed between an earth line and the drain of the first switching three-terminal element, wherein said first counter electrode opposes plural picture element electrodes corresponding to plural rows of said matrix, and also opposes plural picture element electrodes corresponding to plural columns of said matrix.

2. A liquid crystal display apparatus according to claim 1, wherein the liquid crystal has a specific resistance of not greater than $10^9$ $\Omega$m within a range of temperatures in which the liquid crystal display apparatus is operable.

3. A liquid crystal display apparatus according to claim 1, wherein the a.c. voltage source delivers a positive/negative symmetrical a.c. voltage having reversed phases in each one cycle.

4. Liquid crystal display apparatus as in claim 1 wherein said plurality of unit circuit areas are adjacent to one another, and the first counter electrode is shared by picture element electrodes in adjacent circuit areas.

5. Liquid crystal display apparatus as in claim 1 wherein said plurality of unit circuit areas are adjacent to one another, and the counter electrodes in a first of said plurality of unit circuit areas overlay the counter electrodes for the picture element connected to a data signal line in a unit circuit area adjacent to said first unit circuit area.

6. A liquid crystal display apparatus comprising a plurality of unit circuit areas formed with electrode lines X and Y crossing each other in an electrically isolated state, each unit circuit area comprising:
- a picture element electrode and a counter electrode,
- a first switching three-terminal element having a source connected to the line X and a gate connected to the line Y near a crossover of the lines X and Y,
- a liquid crystal layer being disposed between the picture element electrode and the counter electrode,
- a second switching three-terminal element having its gate connected to a drain of the first switching three-terminal element, and having its source and drain, one of its source and drain being connected to said picture element electrode and the other of its source and drain being connected to a common line, said common line applying an a.c. voltage to said other of its source and drain, said a.c. voltage having an opposite phase to an a.c. voltage applied to the counter electrode, and
- a signal storing capacitor formed between an earth line and the drain of the first switching three-terminal element.

7. A liquid crystal display apparatus according to claim 6, which further comprises a dummy load inserted between the drain of the second switching three-terminal element and the common line, the dummy load having an impedance approximately equal to that of the liquid crystal.

8. Liquid crystal display apparatus as in claim 6 wherein said plurality of unit circuit areas are adjacent to one another, and the counter electrode in one unit circuit area is shared by a counter electrode in an adjacent unit circuit area.

9. Liquid crystal display apparatus as in claim 6 wherein said plurality of unit circuit areas are adjacent to one another, and the same AC voltage is applied to the counter electrodes in each of said adjacent unit circuit areas.

10. Liquid crystal display apparatus as in claim 6 wherein said plurality of unit circuit areas are adjacent to one another, and the counter electrodes in a first of said plurality of unit circuit areas overlay the counter electrodes for the picture element connected to a data signal line in a unit circuit area adjacent to said first unit circuit area.

11. A liquid crystal display apparatus comprising a plurality of unit circuit areas formed with electrode lines X and Y crossing each other in an electrically isolated state, each unit circuit area comprising:
- a picture element electrode and a counter electrode,
- a first switching three-terminal element having a source connected to the line X and a gate connected to the line Y near a crossover of the lines X and Y,
- a liquid crystal layer being disposed between the picture element electrode and counter electrode,
- a dummy load coupled to a common line,
- a second switching three-terminal element having a gate, a source and a drain, the gate of said second element connected to a drain of the first switching three-terminal element, and having one of its source and drain connected to the picture element electrode and the other of its source and drain connected through said dummy load to said common line,
- a signal storing capacitor being disposed between an earth line and a drain of the first switching three-terminal element, and
- an a.c. voltage source for applying an a.c. voltage to the counter electrode.

12. Liquid crystal display apparatus as in claim 11 wherein said plurality of unit circuit areas are adjacent to one another, and the counter electrode in one unit circuit area is shared by a counter electrode in an adjacent unit circuit area.

13. Liquid crystal display apparatus as in claim 11 wherein said plurality of unit circuit areas are adjacent to one another, and the same AC voltage is applied to the counter electrodes in each of said adjacent unit circuit areas.

14. Liquid crystal display apparatus as in claim 11 wherein said plurality of unit circuit areas are adjacent to one another, and the counter electrodes in a first of said plurality of unit circuit areas overlay the counter electrodes for the picture element connected to a data signal line in a unit circuit area adjacent to said first unit circuit area.

15. A liquid crystal apparatus comprising a plurality of unit circuit areas formed with electrode lines X and Y crossing each other in an electrically isolated state each unit circuit area comprising:
  a picture element electrode and counter electrode,
  a first switching three-terminal element having a source connected to the line X and a gate connected to the line Y near a crossover of the lines X and Y,
  a liquid crystal layer being disposed between the picture element electrode and the counter electrode,
  a second switching three-terminal element having its gate connected to a drain of the first switching three-terminal element, and having its source and drain, one of its source and drain being connected to said picture element electrode and the other of its source and drain being connected to a common line, said common line applying an a.c. voltage to said other of its source and drain, said a.c. voltage having an opposite phase to an a.c. voltage applied to the counter electrode, and
  a signal storing capacitor formed between the adjacent line Y and the drain of the first switching three-terminal element.

16. Liquid crystal display apparatus as in claim 15 wherein said plurality of unit circuit areas are adjacent to one another, and the counter electrode in one unit circuit area is shared by a counter electrode in an adjacent unit circuit area.

17. Liquid crystal display apparatus as in claim 15 wherein said plurality of unit circuit areas are adjacent to one another, and the same AC voltage is applied to the counter electrodes in each of said adjacent unit circuit areas.

18. Liquid crystal display apparatus as in claim 15 wherein said plurality of unit circuit areas are adjacent t one another, and the counter electrodes in a first of said plurality of unit circuit areas overlay the counter electrodes for the picture element connected to a data signal line in a unit circuit area adjacent to said first unit circuit area.

19. A liquid crystal display apparatus of the type having plural control lines, said apparatus receiving a.c. source voltages Vc and Vc', said apparatus comprising:
  a picture element electrode,
  a counter electrode coupled to said a.c. source voltage Vc,
  a liquid crystal layer disposed between the picture element electrode and the counter electrode,
  a first switching element having a source, a drain and a gate, said first switching element source and gate being coupled to said control lines,
  a signal storing capacitor being disposed between one of said control lines and said first switching element drain, and
  a second switching element having a source, a drain and a gate, said second switching element gate connected to said first switching element drain, said second switching element source being connected to said picture element electrode, said second switching element drain being connected to said a.c. source voltage Vc',
  wherein said a.c. source voltages Vc and Vc' are in reverse phase relative to one another.

* * * * *